Figure 1:
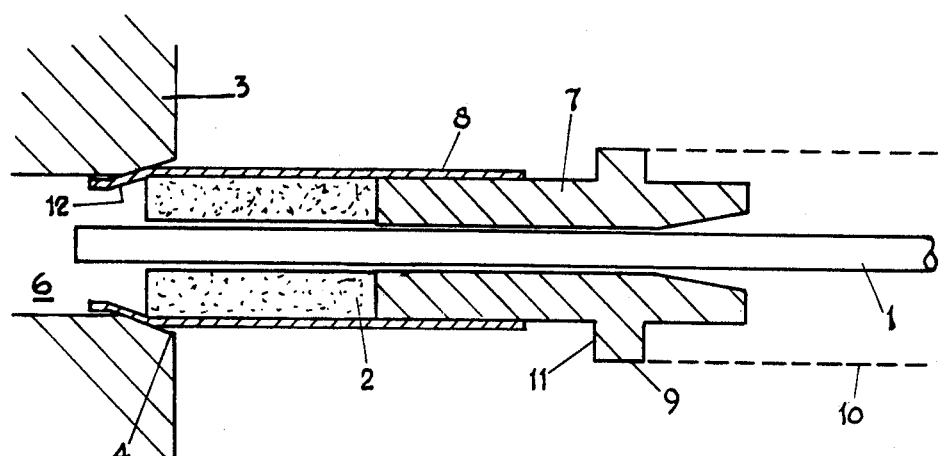
Figure 2:
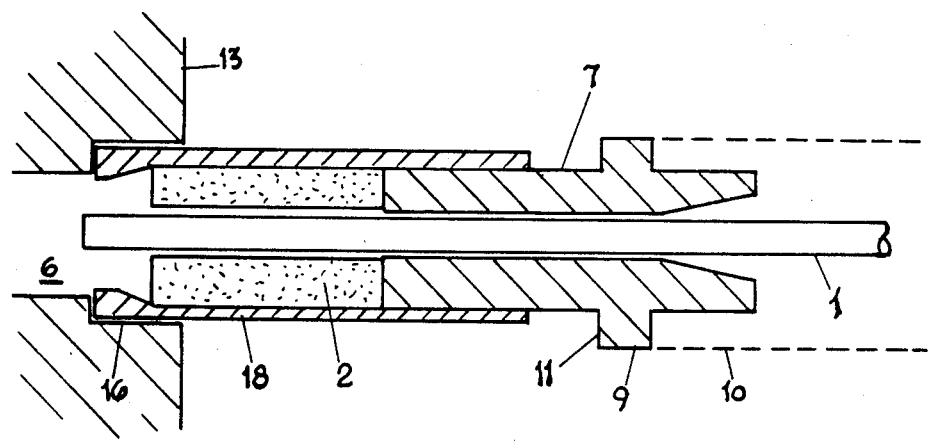

United States Patent [19]
Lewis et al.

[11] 4,261,642
[45] * Apr. 14, 1981

[54] OPTICAL FIBRE TERMINATIONS

[75] Inventors: Edward L. Lewis, East Farley; Trevor A. Morgon, Rainham, both of England

[73] Assignee: Elliott Brothers (London) Limited, Chelmsford, England

[*] Notice: The portion of the term of this patent subsequent to Sep. 26, 1995, has been disclaimed.

[21] Appl. No.: 843,204

[22] Filed: Oct. 18, 1977

[30] Foreign Application Priority Data

Oct. 21, 1976 [GB] United Kingdom ............... 43692/76

[51] Int. Cl.³ ............................................. G02B 5/14
[52] U.S. Cl. ................................................. 350/96.20
[58] Field of Search ................ 350/96.20, 96.21, 96.22

[56] References Cited
U.S. PATENT DOCUMENTS

| | | | |
|---|---|---|---|
| 3,912,362 | 10/1975 | Hudson | 350/96.20 |
| 4,116,655 | 9/1978 | Lewis | 350/96.22 |

FOREIGN PATENT DOCUMENTS 1465493  2/1977  United Kingdom ................. 350/96.20

OTHER PUBLICATIONS

J. N. Stallard, W. E. Steel, "Stuffing of Optical Fibers", *IBM Technical Disclosure Bulletin*, vol. 9, No. 11, Apr. 1967, p. 1581.

*Primary Examiner*—Stewart J. Levy
*Attorney, Agent, or Firm*—Kirschstein, Kirschstein, Ottinger & Cobrin

[57] ABSTRACT

A modification of the hot crimp technique described in U.S. application Ser. No. 701,240 filed 30th June 1976. In that case a bundle of fibres was inserted into a glass sleeve and the sleeve and fibres were thrust into a hot conical bore to compress the sleeve and fibres to remove interstitial dead space.

In an incidental feature of that technique, the compressed bundle is maintained concentric with the outer sleeve surface, and in fact, with the outer surface of a metal sleeve which may provide the conical bore. This feature is adapted for the present invention in which a single fibre is inserted into a close fitting glass sleeve through a tapered lead-in ferrule, the sleeve and ferrule are thrust through an outer metal sleeve having a conical end so that the glass sleeve and fibre are compressed concentrically. The assembly then provides an accurately concentric single fibre termination pin.

9 Claims, 2 Drawing Figures

OPTICAL FIBRE TERMINATIONS

This invention relates to optical fibre terminations and is a modification of the invention the subject of patent application Ser. No. 701,240 filed 30th June 1976.

In a fibre-optic communication system employing single-fibre cables, it is necessary to couple lengths of cable to each other as well as to opto-electronic devices. A major problem with such cable is obtaining good axial alignment between the coupled fibers. The fibres are typically only a few thousandths of an inch in diameter and consequently even a small axial misalignment can cause severe loss of light. In a method that has been proposed, the fibre is fitted into a ringstone which in turn is mounted in an outer ferrule forming part of a connecting pin. (A ringstone is a watch jewel usually in the form of a doughnut, with very accurate dimensions and of accurately concentric bore.) When a portion of the fibre has been stripped of its protective sheath, its diameter is measured and a ringstone selected with a bore which is very close fit on the fibre. The fibre-optic cable is then mounted in the outer ferrule and the ringstone slid down the fibre into a recess provided in the end of the ferrule. Because of the accurate dimensions of the ringstone the fibre is held with very close tolerance co-axially within the outer ferrule. An adhesive is used to secure the components and the termination completed by polishing the end of the fibre and ringstone flat. The main drawbacks of the technique are that a ringstone has to be selected to suit the fibre and an adhesive used to hold the components together. Selection of a ringstone is also a problem because the fibre varies is diamter along its length, and where the cable is cut a ringstone must be selected for that particular portion of fibre. This is not ideal for shop floor use since a large selection of ringstones will be required, together with the services of a skilled operator.

The invention of the parent case referred to above, of which the present invention is a modification, concerns the termination of a multi-fibre optical fibre cable by a method in which the bundle of fibres is urged into a comical bore with the application of heat if necessary, to soften them. In a preferred arrangement the bundle of fibre ends is fed through a close fitting glass ferrule and the ferrule and fibres are together compressed radially in a comical bore. The result is an accurately concentric bundle of fibres which is then easily mated to a corresponding bundle in a coupling connector.

A similarly concentric arrangement is one object of the present invention.

According to one aspect of the present invention is a method of terminating a single-fibre cable for use in a fibre-optic communication system, the bare fibre is inserted into a deformable ferrule having accurately concentric walls and which is a close sliding fit on the fibre, the ferrule and fibre are then urged into a member having an accurately conical bore so as to compress the ferrule onto the fibre and provide a pin of substantial diameter relative to the fibre while maintaining the fibre concentric in the pin.

There may be provided an outer metal ferrule in which the deformable ferrule is a close fit, the outer ferrule being urged into said conical bore together with said deformable ferrule and being thereby radially compressed onto the deformable ferrule. This outer ferrule may be of substantially uniform wall thickness and may have a leading end which conforms to the conical bore.

Alternatively, the leading end of the outer metal ferrule may have a conical bore formation constituting said conical bore, and the compression of said deformable ferrule within the outer ferrule providing permanent attachment between the two ferrules.

Where necessary, the deformable ferrule may be heated to facilitate its compression within the conical bore. This heat is conveniently supplied through the member providing the conical bore.

Alternatively, the deformable ferrule may be of a material which is deformable under pressure and without the application of external heat.

Preferably, the deformable ferrule and the outer ferrule are together urged into the conical bore by means of a ram ferrule having a leading portion of outside diameter equal to that of the deformable ferrule and a bore which is a sliding fit on the fibre at least as close as the fit of the deformable ferrule on the fibre, the ram ferrule having, at a position remote from its leading portion, a shoulder for the engagement of the outer ferrule. This shoulder may be part of a flange provided for engagement by a ram tool in the urging of the deformable ferrule into the conical bore.

According to another aspect of the invention, termination equipment for terminating a single-fibre optical fibre cable, comprises a formable ferrule having a bore which is close sliding fit on the bore fibre, a member having a hole of conical bore for the compressin of the deformable ferrule on to the fibre when the ferrule is urged axially into the conical bore, and a ram tool adapted to locate in relation to said member and to urge the deformable ferrule and the optical fibre embraced thereby into the conical bore. The termination equipment may include a metal ferrule which is a close fit on the deformable ferrule, and a ram ferrule having a leading portion which if outside diameter equal to that of the deformable ferrule and a bore which is at least as close a sliding fit on the fibre as is the deformable ferrule, the ram ferrule being adapted to engage both the deformable ferrule and the outer ferrule to urge them into the conicl bore when driven by the ram teel. Preferably, the member having a conical bore includes a source of heat whereby to heat and soften the deformable ferrule as it is urged into the conical bore.

According to a further aspect of the invention, a pin connector for a single-fibre optical cable, comprises a deformable ferrule having a bore which is a close sliding fit on an optical fibre, an outer metal ferrule which is a close fit on the deformable ferrule, a ram ferrule, one end portion of which has the same outer diamter as the deformable ferrule and a bore which is at least as close a sliding fit on the optical fibre as is the deformable fibre, the ram ferrule being adapted to engage, both the deformable ferrule within the outer ferrule, and the outer ferrule itself, so that the deformable ferrule and the outer ferrule can together be urged axially into a conical bore so as to compress the deformable ferrule radially into the optical fibre and form a pin termination.

Preferably, the ram ferrule has a flange remote from the leading end for forward engagement with the outer ferrule and rearward engagement by a ram tool.

An optical fibre termination and a method of obtaining it in a single-fibre cable, will now be described, by way of example, with reference to the accompanying drawings which show two embodiments of a termination in course of production.

Referring to FIG. 1, the sheath 10 of the cable is removed from an inch or so of the cable end, the exposed fibre is cleaned of any sheath remnants or either contamination and the fibre is then threaded into the components shown. Thes comprise a ram ferrule 7, a deformable glass ferrule 2 and an outer metal ferrule 8.

The outer ferrule 8 is initially a plain hollow cylinder of accurately uniform wall thickness such as to permit a small degree of compression. A relatively soft metal such as copper or aluminium or alloys thereof is suitable. The deformable ferrule 2 (although this glass ferrule is referred to herein as the deformable ferrule, the outer metal ferrule 8 is also deformable in this embodiment) is a close fit in the outer ferrule 8 as also in the ram ferrule 7, these two having equal outer diameters.

The deformable ferrule 2 has a bore which is a close sliding fit on the fibre 1 as also is the bore of the ram ferrule 7. If there is any disparity between the two bores the ram ferrule 7 should have the closer fit since it acts as a guide in feeding the fibre 1 into the deformable ferrule 2.

The three components, outer ferrule 8 and two inner ferrules 2 and 7 are pre-assembled. A shoulder 11 on a flange 9 towards the rear of the ram ferrule is positioned so as to engage the outer ferrule 8 while the deformable ferrule is still enclosed.

A member 3 has a bore 6 with a conical lead-in 4. The outer end of the concical bore is of greater diameter than the original diameter of the outer ferrule 8, while the inner end diameter is a few thousandths of an inch smaller than the original ferrule 8 diameter. The taper shown in the drawing is, of course, greatly exaggerated for clarity.

A ram tool (not shown), which may be manually or hydraulically operated, has a thrust face which engages the rear face of the flange 9. The ram tool is adapted to be mounted in fixed relation to the member 3 so as to maintain axial alignment during the operation. The member 3 is provided with a heating source (not shown) for use where heat is necessary to soften the deformable ferrule 2.

In operation, the assembled pin connector, including the fibre 1 threaded through it is assembled between the member 3 and the ram tool. Heat is applied, this being transferred to the ferrule 2 through the outer ferrule 9. The ram tool is then operated, urging the outer ferrule 8 and the ferrule 2 into the bore 6 in unison. The ferrule 8 is radially compressed on the ferrule 2 which in turn is compressed on to the fibre 1.

When a sufficient length of the leading end has been compressed in the bore 6, a step prevents further insertion and the pin connector so formed is removed. The relative ferrule lengths are such that the glass ferrule 2 and fibre 1 then protrude slightly from the compressed ferrule 8. These protrusions are then ground off and the surface polished to leave an optical coupling surface accurately centred in the metal ferrule.

This method may be slightly modified by preforming the ferrule 8 as shown in FIG. 1 with its own accurately formed conical bore 12 at the leading end. The position of the outer ferrule 8 is then determined by the seating of this comical portion in the conical bore 4 of the member 3. The ram tool then pushes the glass ferrule 2 through the ferrule 8 and into the conical bore 12. This arrangement may well be preferable since the ferrule 8 can then be preformed by any process suited to the metal of which it is made. There is also better heat conduction between the conical bore of the member 3 and the matching conical surface of the ferrule 8. Abutment between the rear end of the ferrule 8 and the shoulder 11 may then provide a step for the operation of the ram tool.

In the modification shown in FIG. 3, there may be no conical bore in the member 13, only a cylindrical hole 16 which loosely fits the cylindrical end of the ferrule 18. The required conical bore for the compression of the glass ferrule 2 is then provided in the ferrule 18 as shown. There if preferably, of course, a lead-in taper into the hole 16 to facilitate insertion of the pin assembly.

As described, the ram ferrule 7 has a tapered lead-in at its rear end to facilitate the insertion of the fibre. As long as the ram ferrule 7 is at least as good a fit on the fibre as is the glass ferrule 2, and both are close fits within the metal ferrule 8, then the fibre will slip without obstruction through the glass ferrule 2.

In a further modification, the metal ferrule 8 may be emitted and the fibre rely solely on the glass ferrule 2 for support, at least for the purposes of a sub-assembly.

If the glass ferrule 2 is urged into the cemical bore 4 by the raw tool directly, them, of course, the ram ferrule 7 is also emitted and the glass ferrule is provided with a tapered lead-in similar to that shown in the ram ferrule 7.

The above processes are almost identical to that proposed for fibre bundles and described in the above parent case except that the only dead space removed is between the fibre 1 and the bore of the glass ferrule 2, and consequently, the fibre is not deferred into a polygen but remains cylindrical. Because of the similarity with the terminating bundle cables the same tool can be used with only minor modifications on both types of cables.

The technique described herein is a direct application of the "hot crimp" method proposed in the parent case for fibre-eptic bundles using purely glass fibres. However, the single-fibres of some cables are clad with a plastic which is the medium against which internal reflection occurs, and such fibres can not be dealt with by the method described because of the heat applied. To overcome this limitation, the glass ferrule is replaced by one which can be deformed by pressure alone or with the assistance of heat at a low temperature which does not damage the plastic cladding.

It is a feature of the present invention that because it is unnecessary to change the shape of the fibre a deformable ferrule need only compress around the fibre with pressure sufficient to seal it into the termination.

It will be clear that because a deformable ferrule is used the problem of locating the fibre accurately into the termination by the operator no longer arises.

We claim:

1. A method for terminating a single-fibre optical cable for use in a fibreoptic communication system, including the steps of
   (a) baring an end portin of said fibre,
   (b) inserting said end portion into a deformable ferrule having accurately concentric walls, said ferrule being a close sliding fit on said fibre, and
   (c) urging said ferrule and said fibre axially into a member having an accurately conical bore to compress said ferrule onto said fibre.

2. A method according to claim 1, wherein said deformable ferrule is inserted into an outer metal ferrule in which said deformable ferrule is a close fit, said fibre, said deformable ferrule and said outer metal ferrule being together urged into said member having a conical bore to compress said outer metal ferrule onto said deformable ferrule and said deformable ferrule onto said fibre.

3. A method according to claim 2, wherein said outer metal ferrule is of substantially uniform wall thickness and has a leading end which conforms to said conical bore.

4. A method according to claim 1, wherein there is provided an outer metal ferrule in one end of which said deformable ferrule is a close fit, the other, leading, end of said outer metal ferrule having a conical bore formation constituting said conical bore.

5. A method according to claim 1, wherein said deformable ferrule is heated to facilitate its compression within said conical bore.

6. A method according to claim 5, wherein heat is supplied through said member providing said conical bore.

7. A method according to claim 1, wherein said deformable ferrule is of a material which is deformable under pressure and without the application of external heat.

8. A method according to claim 2 wherein said deformable ferrule is urged into said conical bore by means of a ram ferrule having a leading portion of outside diameter equal to that of the deformable ferrule and a bore which is a sliding fit on said fibre at least as close as the fit of the deformable ferrule on said fibre, the ram ferrule having, at a position remote from said leading portion, a shoulder for the engagement of said outer ferrule.

9. A method according to claim 8, wherein said ram ferrule is driven by a ram tool which engages a flange on the ram ferrule, said shoulder being provided by the leading face of said flange.

* * * * *